(12) United States Patent
Moore et al.

(10) Patent No.: US 8,784,679 B2
(45) Date of Patent: Jul. 22, 2014

(54) AQUEOUS POWDER WATER TREATMENT COMPOSITIONS AND METHODS FOR MAKING SAME

(75) Inventors: Richard M. Moore, Cincinnati, OH (US); Lyle H. Steimel, Forest Park, OH (US)

(73) Assignee: Dubois Chemicals, Inc., Sharonville, OH (US)

( * ) Notice: Subject to any disclaimer, the term of this patent is extended or adjusted under 35 U.S.C. 154(b) by 98 days.

(21) Appl. No.: 13/280,987

(22) Filed: Oct. 25, 2011

(65) Prior Publication Data

US 2013/0099158 A1 Apr. 25, 2013

(51) Int. Cl.
*C02F 5/08* (2006.01)

(52) U.S. Cl.
USPC ........... 252/178; 252/175; 252/180; 210/700; 510/247

(58) Field of Classification Search
USPC ........... 252/175, 178, 180; 510/247; 210/700
See application file for complete search history.

(56) References Cited

U.S. PATENT DOCUMENTS

| | | | | |
|---|---|---|---|---|
| 4,609,483 | A * | 9/1986 | Cuisia et al. | 252/180 |
| 4,663,053 | A * | 5/1987 | Geiger | 210/699 |
| 4,680,125 | A * | 7/1987 | Cuisia et al. | 210/697 |
| 4,874,541 | A * | 10/1989 | Steimel et al. | 252/178 |
| 5,063,131 | A * | 11/1991 | Abe et al. | 430/372 |
| 5,183,573 | A * | 2/1993 | Kreh et al. | 210/697 |
| 5,512,243 | A | 4/1996 | Roling | |
| 5,654,198 | A * | 8/1997 | Carrier et al. | 436/6 |
| 5,961,845 | A | 10/1999 | List et al. | |
| 6,040,406 | A * | 3/2000 | Carrier et al. | 526/238.22 |
| 6,797,197 | B2 * | 9/2004 | Steimel et al. | 252/188.28 |
| 7,141,174 | B2 * | 11/2006 | Steimel et al. | 210/700 |
| 2009/0298738 | A1 * | 12/2009 | Kneipp et al. | 510/245 |
| 2010/0028202 | A1 * | 2/2010 | Wan et al. | 422/62 |

FOREIGN PATENT DOCUMENTS

EP 0 321 066 B1 6/1989

OTHER PUBLICATIONS

21 CFR; Title 21; Ch. I; Section 173.310; Food and Drug Administration; Department of Health and Human Services; Apr. 1, 2011 Edition.
KLM, Inc.; Product Information Bulletin; BWT-807S; Solid Boiler Treatment; Mar. 9, 2004.
KML, Inc.; Product Information Bulletin; Vola Mene 805; Solid Condensate Corrosion Inhibitor; Mar. 9, 2004.
KML, Inc.; Product Information Bulletin; BWT-238; Oxygen Scavenger; Feb. 13, 2004.

* cited by examiner

*Primary Examiner* — Nicole M Buie-Hatcher
*Assistant Examiner* — M. Reza Asdjodi
(74) *Attorney, Agent, or Firm* — Dinsmore & Shohl LLP

(57) ABSTRACT

Embodiments of a method of producing an aqueous powder composition for treating water comprise mixing sodium metabisulfite powder with amines, wherein the amines comprises liquid cyclohexylamine, and adding water to the mixture of sodium metabisulfite powder and liquid cyclohexylamine to catalyze the production of the aqueous powder composition.

6 Claims, No Drawings

AQUEOUS POWDER WATER TREATMENT COMPOSITIONS AND METHODS FOR MAKING SAME

TECHNICAL FIELD

The present invention is generally directed to aqueous powder compositions for the treatment of water, and is specifically directed to aqueous powder compositions and the methods of making compositions utilized in the treatment of a condensate stream of a boiler.

BACKGROUND

As would be familiar to the person of ordinary skill in the art, a boiler requires extremely pure water in order to avoid a plurality of different problems. Unfortunately, water coming into most boilers is not pure enough to avoid these problems. Impurities in the water, including gases such as oxygen and carbon dioxide, would rapidly contaminate the water and damage the boiler.

In addition, steam generated in the boiler will condense into water used (referred to as condensate,) as it is used and returned to the boiler through condensate lines. Condensed steam (also referred to as condensate), which is generated in the boiler and accompanying boiler lines, is a major source of impurities. Condensate generally traps impurities, especially gases including oxygen and carbon dioxide, from the air and becomes contaminated. These impurities, as well as the typically acidic nature of condensate, create a corrosive environment in the condensate lines unless the condensate is treated chemically. The contaminated condensate inevitably reenters the pool of boiler water, thereby further contaminating the boiler water. Other problems including accumulation of scale, maintenance of pH, boiler pitting by oxygen, and the generation of carbonic acid in the water may occur as a result of contaminated boiler water. Therefore, the contaminants must be removed or treated.

Various chemical compositions are used for the treatment of water in boilers as well as other devices such as cooling towers. Typically, these chemical compositions are liquid products containing one or more components, which are manufactured and then shipped in containers such as drums, to the end users. The process is labor and material intensive and requires the shipment of heavy drums which must be disposed of once the chemical product is used.

Accordingly, improved dry solid treatment compositions are desirable as they ease the transportation and handling of the treatment composition. In addition, is also desirable to provide improved powder compositions that effectively treat impurities from boiler condensate streams, and it is additionally desirable to provide improved methods to produce these improved powder compositions.

SUMMARY

Embodiments of the present disclosure are directed to aqueous powder compositions and the methods of making aqueous powder compositions utilized in the treatment of a condensate stream of a boiler.

According to one embodiment, a method of producing an aqueous powder composition for treating water is provided. The method comprises mixing sodium metabisulfite powder with amines, wherein the amines comprise liquid cyclohexylamine, and adding water to the mixture of sodium metabisulfite powder and liquid cyclohexylamine to catalyze the production of the aqueous powder composition.

According to yet another embodiment, an aqueous powder composition for treating water is provided. The aqueous powder composition comprises about 35 to about 55% by weight of amines, wherein the amines comprise cyclohexylamine, about 35 to about 55% by weight of bisulfites selected from the group consisting of sodium bisulfite, sodium metabisulfite, and mixtures thereof, and about 5 to about 10% by weight of water.

According to a further embodiment, another powder composition is provided. The powder composition comprises about 25 to about 50% by weight of the above aqueous powder composition as a powder premix, about 20 to about 45% by weight of an alkaline pH adjusting agent, about 5 to about 10% by weight of sodium sulfite, and about 15% to about 35% by weight of additional additives.

These and additional objects and advantages provided by the embodiments of the present invention will be more fully understood in view of the following detailed description.

DETAILED DESCRIPTION

Embodiments of a method of producing an aqueous powder composition for treating water are provided. The method comprises the steps of mixing sodium metabisulfite powder with amines, wherein the amines comprises liquid cyclohexylamine, and adding water to the mixture of sodium metabisulfite powder and liquid cyclohexylamine to catalyze the production of the aqueous powder composition. While the present method focuses on the mixing of sodium metabisulfite with liquid cyclohexylamine, it is contemplated that additional bisulfites, for example, sodium bisulfite, or sulfites, such as sodium sulfite, may be added instead of or in addition to the sodium metabisulfite. When sodium metabisulfite contacts the water, which catalyzes the production of the powder, at least some of the sodium metabisulfite is converted into sodium bisulfite.

As would be familiar to the skilled person, amines are utilized to scavenge oxygen and neutralize carbon dioxide inside the boiler condensate. Various amounts by weight of the amines are contemplated herein. For example, the amines may be present in the composition at an amount of about 35 to about 55% by weight, or about 40 to about 50% by weight. Without being bound by theory, the reaction of liquid cyclohexylamine with sodium metabisulfite powder yielded surprisingly beneficial results in the present powder production method. Specifically, a dry powder form comprising cyclohexylamine and sodium metabisulfite is free of clumps, which is desirable due to packaging concerns as well as ease of use in the boiler operation. Consequently, in some embodiments, the amines may be comprised entirely of cyclohexylamine, such that the entirety of the composition would include 35 to about 55% by weight, or about 40 to about 50% by weight cyclohexylamine.

That being said, in addition to liquid cyclohexylamine, it is contemplated that other amines may be used in addition to liquid cyclohexylamine. For example, the additional amines may comprise diethylaminoethanol, morpholine, or combinations thereof. In one or more embodiments, the aqueous powder composition may comprise about 0 to about 15% by weight, or 1 to about 10%, or about 2 to about 8% by weight of the composition of morpholine, and may further comprise about 5 to about 20%, or about 10 to about 15% by weight of the composition of diethylaminoethanol. When the composition includes morpholine and/or diethylaminoethanol in addition to cyclohexylamine, the composition may include only about 25 to about 40% by weight cyclohexylamine. Without being bound by theory, the addition of several amines allows for the treatment of boilers systems which have varying lengths and geometries in their condensate return lines.

Additionally, the composition may comprise about 35 to about 55%, or about 40% to about 50% by weight of bisulfites, wherein the bisulfites may comprise sodium metabisulfite, sodium bisulfite, or combinations thereof. As stated above, the sodium metabisulfites may be converted at least partially into sodium bisulfite upon exposure to the water. Without being bound by theory, the inventors surprisingly found that the ratio of amines to bisulfites also greatly impacted the powder production process. In one exemplary embodiment, the amines and bisulfites are added at a ratio by weight of about 1.5:1 to about 1:1.5.

Furthermore, the method of the present invention requires the addition of water as a catalyst. Without being bound by theory, the amount of water added must be precisely controlled in order to produce the desired aqueous powder. In one embodiment, about 5 to about 10% by weight of water is a desirable range. If lower than 5% by weight of water is added, the inventors surprisingly determined the water was ineffective as a catalyst i.e., the desired powder was not produced. Alternatively, if greater than 10% of water was added, the yielded product is a paste, not a dry powder as desired.

After the water has catalyzed the mixture to form the powder, the method may comprise additional processing steps, for example, allowing the aqueous powder composition to reach room temperature by cooling the powder or merely leaving it at room temperature until the powder reaches room temperature. Additional processing steps, for example, heating the mixture of cyclohexylamine and sodium metabisulfite to accelerate the reaction is contemplated herein.

While not being limited to such compositions, embodiments of the present composition generally are free of phosphates. Phosphates, while being conventionally used in many cleaner treatment compositions, is detrimental. For example, phosphates are a contributor to detrimental eutrophication of lakes, rivers, and streams, and are thus increasingly monitored, restricted and/or banned by many municipalities and sewer districts.

While the above-described powder treatment compositions may be utilized on its own for treatment of boiler condensate, it is possible to add additional components to the produced aqueous powder. In one or embodiment, further powders may be produced by mixing the produced aqueous powder composition with one or more components selected from the group consisting of alkaline pH adjusting agents, anti-limescale additives, desludging agents, additional oxygen scavengers, and combinations thereof.

Various compositions are contemplated for these additives. For example, the alkaline pH adjusting agents suitable for the present invention include carbonates such as sodium and potassium carbonate, hydroxides such as ammonium, sodium, or potassium hydroxide, and amines including various primary, secondary, or tertiary amines capable of maintaining a basic pH in the water. In one embodiment, the alkaline pH adjusting agents includes sodium hydroxide. The alkaline pH adjusting agents may be present in various suitable amounts, for example, from 0.01 to about 60% by weight, or about 10% to about 50% by weight, or about 20 to about 45% by weight of an alkaline pH adjusting agents.

Anti-limescale agents, which also control the iron levels in boiler condensate streams, may include sodium glucoheptonate, potassium glucoheptonate, or combinations thereof. In one embodiment, the anti-limescale agent includes sodium glucoheptonate at an amount of between 0.01% by weight to about 5% by weight, or about 0.01-2% by weight of the composition. Desludging agents, such as sodium poly-methacrylate, sodium polymaleate, or combinations thereof, may also be included, for example, at an amount between 0.01% by weight to about 5% by weight, or about 0.01-2% by weight of the composition.

Moreover, the present powder compositions include oxygen scavengers in the form of the bisulfites; however, additional oxygen scavengers are contemplated herein. For example, and not by way of limitation, these additional oxygen scavengers may include sulfites such as sodium or potassium sulfite and polyhydroxy acids such as ascorbic acid and erythorbic acid. These additional oxygen scavengers may be added at an amount of about 0.01% by weight to about 20% by weight of the composition, or about 5% by weight to about 10% by weight of the composition.

In another embodiment, the above described powder treatment compositions may be added as a powder premix, and then mixed with other ingredients to produce another powder composition. For example, it is contemplated to produce a composition comprising about 25 to about 50% by weight of the powder premix, about 20 to about 45% by weight of an alkaline pH adjusting agent, about 5 to about 10% by weight of sodium sulfite, and about 15% to about 35% by weight of additional additives. While this embodiment described the addition of the cyclohexylamine/bisulfite based powder as a powder premix, it is contemplated that all of the components could be added at once i.e., before the formation of the cyclohexylamine/bisulfite based powder.

Various delivery vehicles or containers are contemplated for the powder product of the present invention, for example, bags, boxes, and various containers. In one embodiment, the powder is directed poured from the container into the system location, e.g., the piping which transports the boiler condensate. In further embodiment, it is contemplated to dilute the powder prior to treatment of the boiler condensate. In one or more additional embodiments, it is contemplated to include the powder loosely inside the boiler piping system, or include the powder on a support or substrate inside the piping of the boiler. Moreover, it is contemplated to include the powder in a dissolvable carrier, which is dissolved upon treatment with boiler water. Upon delivery, the powder, which can be construed as an all-in-one treatment composition, utilizes the amines to scavenge oxygen and neutralize carbon dioxide, and further includes oxygen scavengers to further supplement the oxygen scavenging ability. Depending on the level of impurities, other components listed above e.g., anti-limescale additives, may also be added as desired

EXAMPLES

The following tables show a compositional example of the powder used singularly (Table 1) or as part of a powder premix (Table 2).

TABLE 1

| Aqueous Powder | | |
| --- | --- | --- |
| Component | Weight | Weight Percent |
| Cyclohexylamine | 50 g | 45.5% |
| Sodium Metabisulfite | 50 g | 45.5% |
| DI Water | 10 g | 9% |
| Total | 110 | |

TABLE 2

Aqueous Powder used as Premix

| Component | Example 1 Weight Percent | Example 2 Weight Percent |
| --- | --- | --- |
| Cyclohexylamine | 10.2% | 11.4% |
| Sodium Metabisulfite | 14.5% | 16.3% |
| Diethylaminoethanol | 5.1% | 5.7% |
| DI Water | 2.4 | 2.7% |
| Powder Premix Total | 32.2% | 36.1% |
| Soda Ash | 18% | 0 |
| Bel-200 premix* | 8.3% | 6.9% |
| Sodium Sulfite | 5.9% | 9% |
| Sodium Glucoheptonate | 0.8% | 2.1% |
| Aquatreat AR-235-D (Sodium Polymethacrylate) | 4.1% | 5.5% |
| Erythorbic Acid | 1.7% | 0% |
| Sodium Hydroxide | 29.0% | 40.4% |
| Total | 100 | 100 |

*Bel 200 premix is a blend of 64% trisodium phosphate and 36% Belclene 200 (polymaleic acid.)

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of producing a dry powder composition for treating water comprising:
    mixing sodium metabisulfite powder with amines, wherein the amines comprise liquid cyclohexylamine; and
    adding water to the mixture of sodium metabisulfite powder and liquid cyclohexylamine to catalyze production of the dry powder composition,
    wherein the dry powder composition consists of about 35 to about 55% by weight of amines, wherein the amines comprise liquid cyclohexylamine and optionally one or more additional amines, about 35 to about 55% by weight of bisulfites selected from the group consisting of sodium bisulfite, sodium metabisulfite, and mixtures thereof, and about 5 to about 10% by weight of water.

2. The method of claim 1 wherein the dry powder composition is free of phosphates.

3. The method of claim 1 further comprising adding additional amines to the mixture of sodium metabisulfite powder and liquid cyclohexylamine prior to the addition of water.

4. The method of claim 3 wherein the additional amines are selected from the group consisting of diethylaminoethanol, morpholine, or combinations thereof.

5. The method of claim 1 further comprising cooling the dry powder composition to room temperature.

6. The method of claim 1 wherein the sodium metabisulfite and amines are mixed at a ratio by weight of about 1.5:1 to about 1:1.5.

\* \* \* \* \*